United States Patent
Wohlfeld et al.

(10) Patent No.: US 10,984,240 B2
(45) Date of Patent: Apr. 20, 2021

(54) LOCALIZATION AND PROJECTION IN BUILDINGS BASED ON A REFERENCE SYSTEM

(71) Applicant: FARO Technologies, Inc., Lake Mary, FL (US)

(72) Inventors: Denis Wohlfeld, Ludwigsburg (DE); Evelyn Schmitz, Korntal-Münchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 123 days.

(21) Appl. No.: 16/377,659

(22) Filed: Apr. 8, 2019

(65) Prior Publication Data

US 2020/0320295 A1 Oct. 8, 2020

(51) Int. Cl.
- *G06K 9/00* (2006.01)
- *G01V 8/10* (2006.01)
- *G06K 19/06* (2006.01)
- *G06T 17/05* (2011.01)

(52) U.S. Cl.
CPC ........... *G06K 9/00664* (2013.01); *G01V 8/10* (2013.01); *G06K 19/06009* (2013.01); *G06T 17/05* (2013.01)

(58) Field of Classification Search
None
See application file for complete search history.

(56) References Cited

U.S. PATENT DOCUMENTS

| 8,705,012 | B2 | 4/2014 | Greiner et al. | |
| 2013/0207966 | A1* | 8/2013 | Chu | G06T 17/00 345/419 |
| 2016/0314593 | A1* | 10/2016 | Metzler | G01C 15/002 |

FOREIGN PATENT DOCUMENTS

EP   3086283 A1   10/2016

OTHER PUBLICATIONS

Extended European Search Report for Application No. 20164328.5 dated Jul. 31, 2020; 7 pgs.

* cited by examiner

*Primary Examiner* — Leon Flores
(74) *Attorney, Agent, or Firm* — Cantor Colburn LLP (57) ABSTRACT

A system for updating a point cloud of an environment having markers for measuring an environment and a method are provided. The system includes a mobile device having a camera. The system further includes one or more processors responsive to executable computer instructions to perform a method comprising capturing one or more images of at least a portion of the environment that include the one or more markers in the one or more images, identifying the one or more markers within the one or more images, comparing the identified one or more markers to a reference system with known coordinates and integrating the one or more images into a point cloud.

18 Claims, 10 Drawing Sheets

LOCALIZATION AND PROJECTION IN BUILDINGS BASED ON A REFERENCE SYSTEM

BACKGROUND

The subject matter disclosed herein relates to use of a 3D laser scanner time-of-flight (TOF) coordinate measurement device, and in particular to a phase-based TOF measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three-color values (such as red, green, blue "RGB") are collected for each data point.

Reference systems provide a link between a digital world and real world when camera digital images by measuring targets within an environment that can be used for localization and positioning within the environment. Reference systems use targets to obtain accurate and known locations relative to each other in order to register multiple individual scans from their own individual coordinate system into a single, aligned common coordinate reference system. Reference systems are used to measure an environment, e.g., a building, factory or any other enclosure, which can be used for later localization and positioning within the building or factory.

Accordingly, while existing localization and positioning of an environment using reference systems are suitable for their intended purposes, what is needed is a reference system that provides a more accurate link between a real world environment and the digital representations of the environment using certain features of embodiments of the present invention.

BRIEF DESCRIPTION

According to one embodiment, a system for updating a point cloud of an environment having markers is provided. The system includes a mobile device having a camera. The system further includes one or more processors responsive to executable computer instructions to perform a method comprising capturing one or more images of at least a portion of the environment that include one or more markers in the one or more images, identifying the one or more markers within the one or more images, comparing the identified one or more markers to a reference system with known coordinates and integrating the one or more images into a point cloud.

According to another embodiment, a method for measuring an environment is provided. The method comprises installing one or more markers within an environment. The method further comprises capturing, by a camera, one or more images of at least a portion of the environment in which the one or more markers are installed. The method further comprises creating a digital twin of the environment by identifying, by a 3D measuring device, the one or more markers within the one or more images, comparing the identified one or more markers to a reference system with known coordinates and integrating the one or more images into a point cloud.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to measuring an environment using a 3D measuring device having a 3D scanner. Embodiments of the invention provide advantages localizing a mobile photographic device, such as a cellular phone, within the environment and based on identifying one or more markers placed within the environment and their positions in a point cloud generated by the 3D measuring device. Embodiments of the invention provide advantages in providing a layout and/or placement of equipment within the environment. Embodiments of the invention provide still further advantages in updating images stored within the point cloud using the mobile photographic device.

Figure 1:
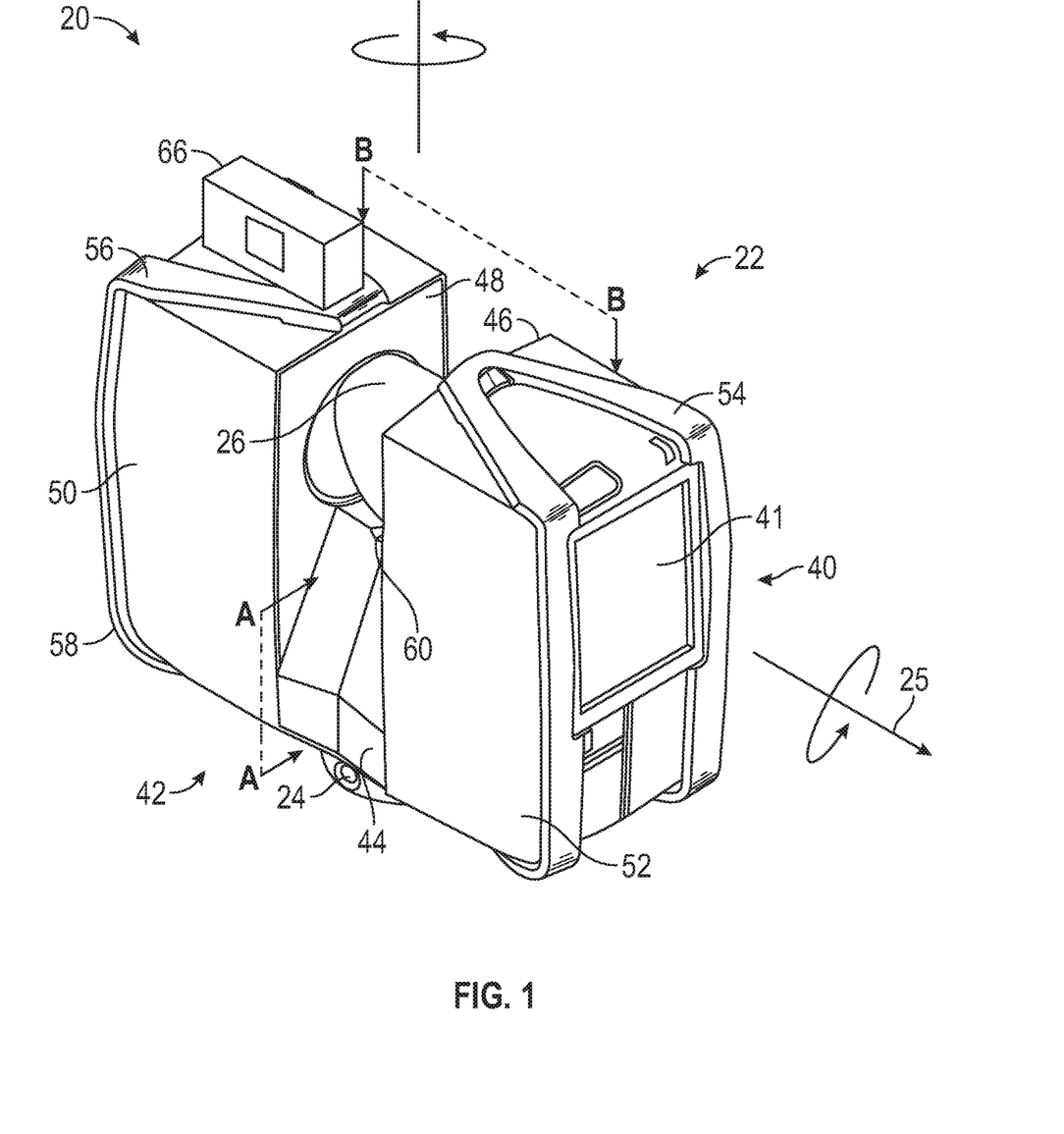
FIG. 1 is a perspective view of a laser scanner in accordance with an embodiment of the invention.
Figure 2:
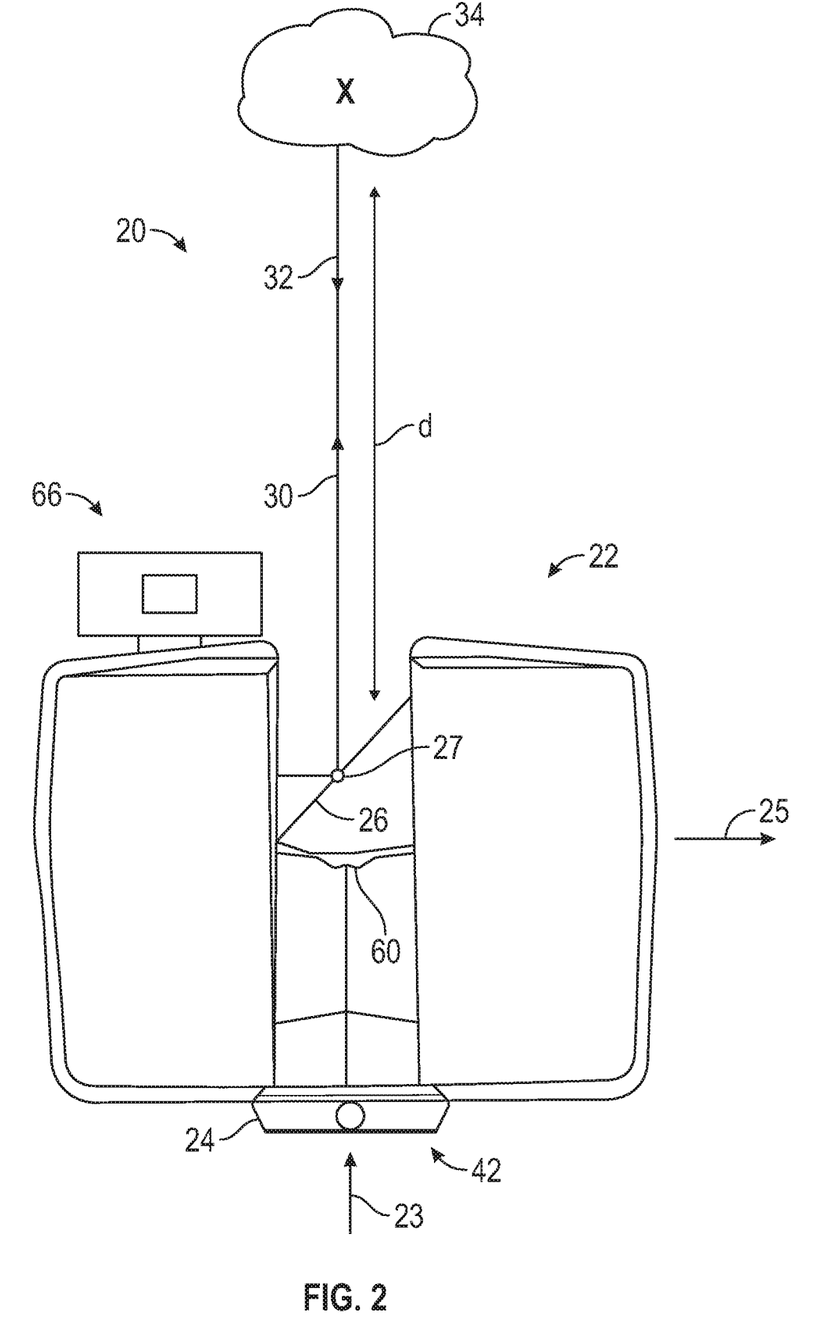
FIG. 2 is a side view of the laser scanner illustrating a method of measurement according to an embodiment.
Figure 3:
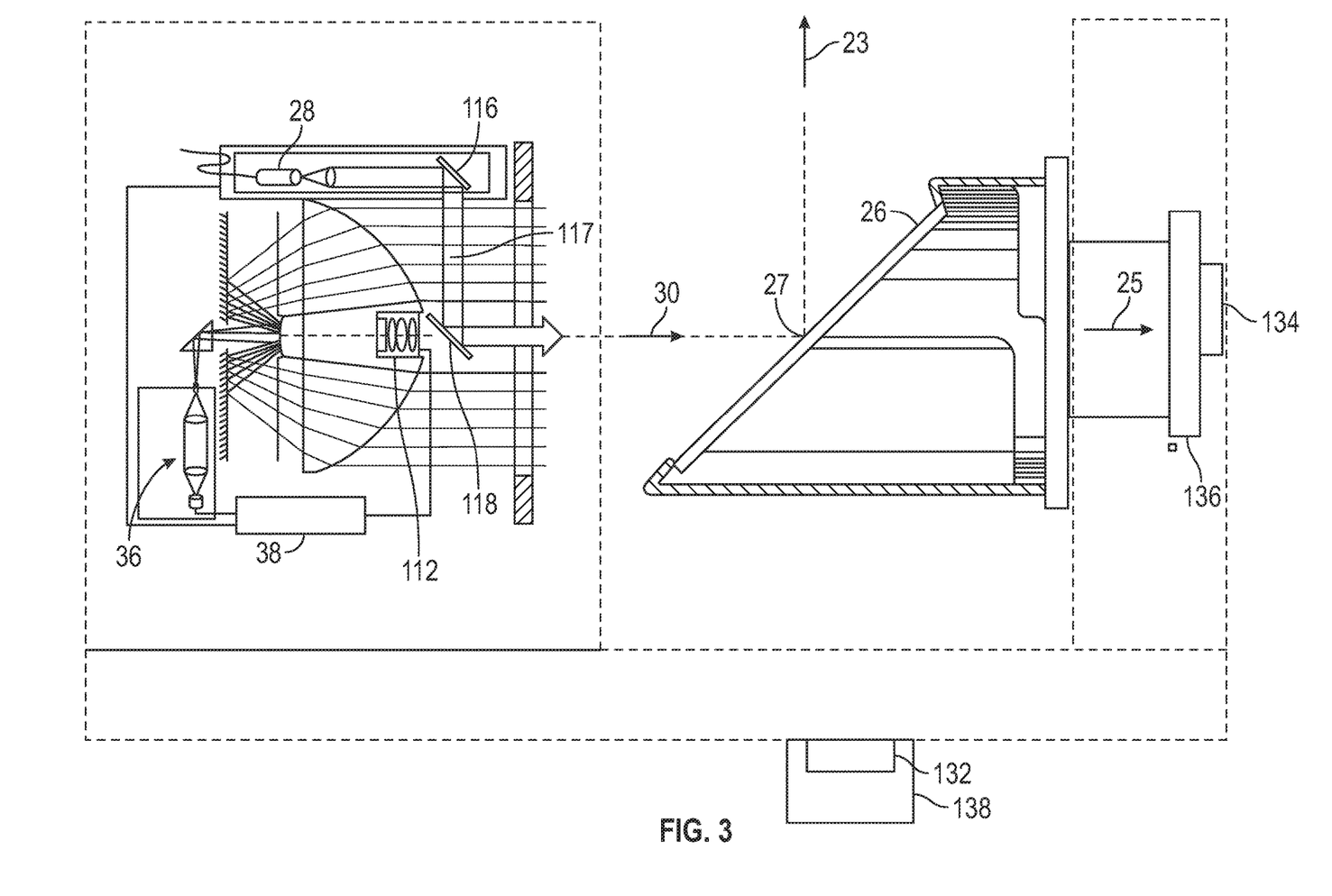
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment, the phase shift of modulation in light emitted by the laser scanner 20 and the point X is determined and evaluated to obtain a measured distance d.

As used herein TOF scanners may use a variety of methods for determining the distance d. These methods may include modulating the emitted light (e.g., sinusoidally) and measuring the phase shift of the returning light (phase-based scanners), or measuring the time interval between the emitted and returning light pulses (pulse-based scanners). The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. It should be appreciated that while embodiments herein may refer to a phase-shift type TOF scanner, this is for example purposes and the claims should not be so limited. A method of measuring distance based on the time-of-flight of light (whether phase or pulse based) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
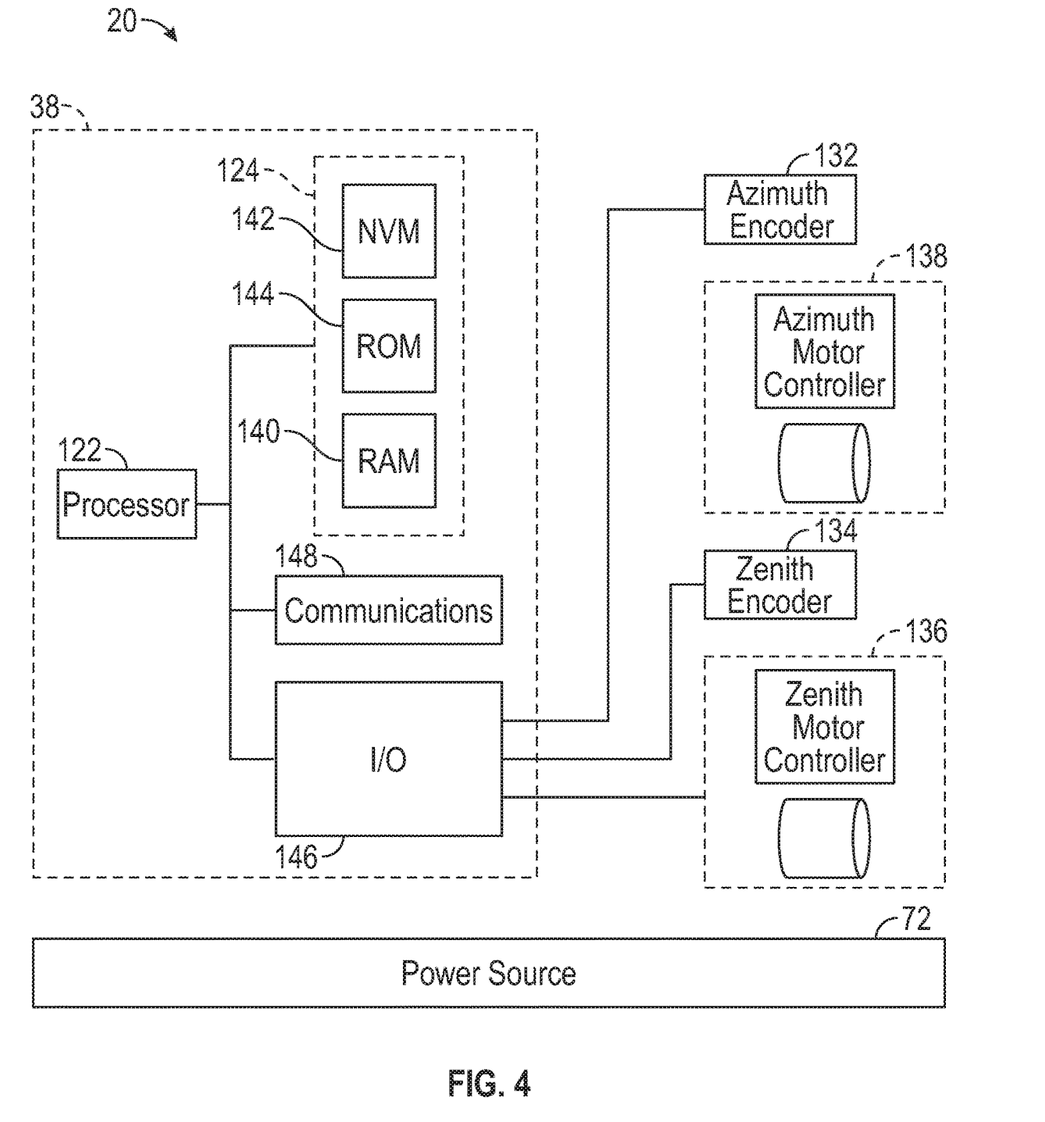
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera and is given certain instructions for the purpose of generating a 3D point cloud of a scanned environment. Controller 38 provides operating signals to the light source 28, light receiver 36, panoramic camera, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g., Ethernet, serial, USB, BluetoothTM or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5A:
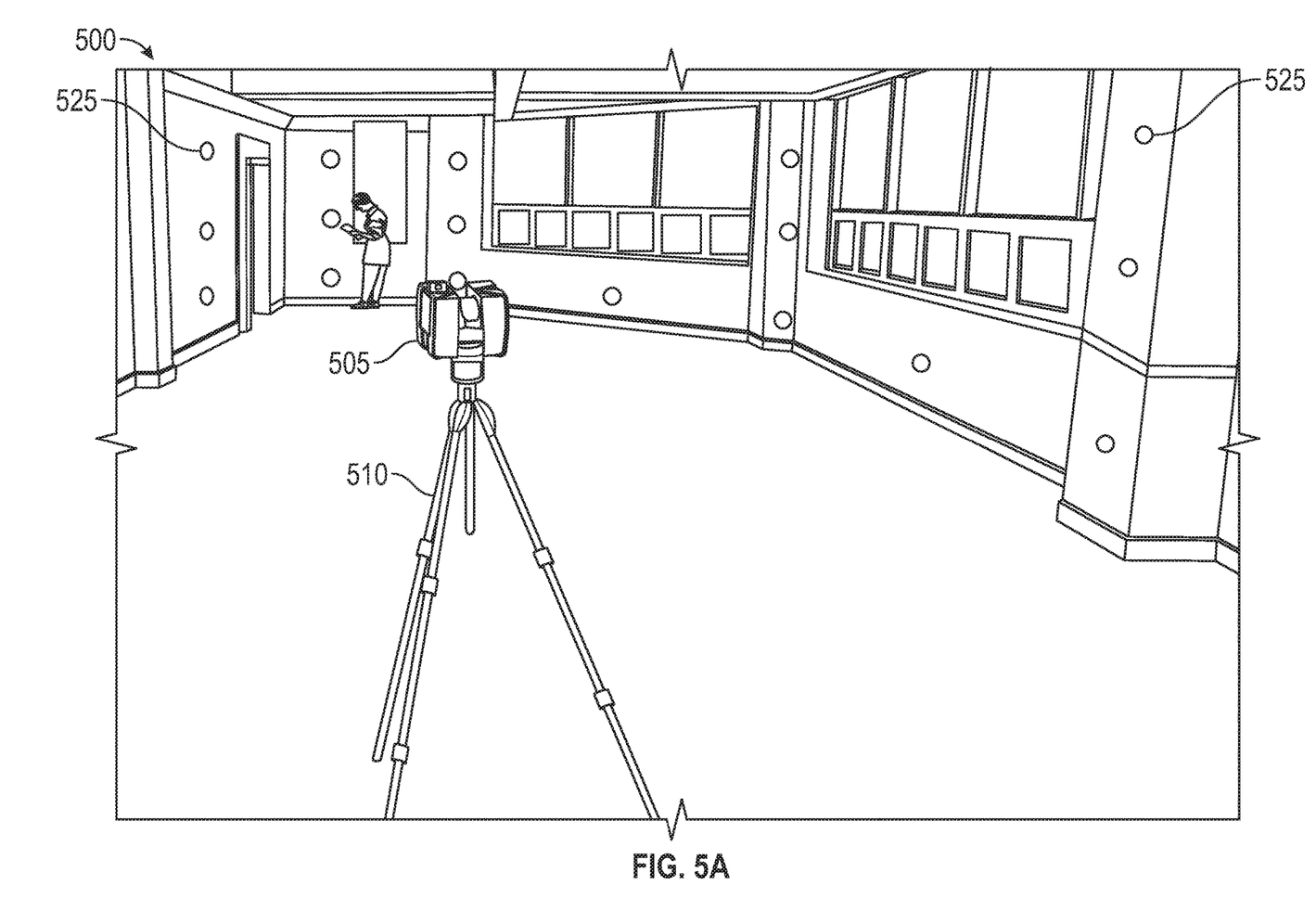
FIG. 5A illustrates a schematic illustration of the laser scanner of FIG. 1 measuring an environment according to an embodiment.

FIG. 5A illustrates an environment 500 in which a laser scanner is utilized to make measurements according to an embodiment. A laser scanner 505, which can be the laser scanner of FIG. 1, can be placed at one or more designated location within the environment 500. The laser scanner 505 can be placed on a tripod 510 having a pan-tilt axis, or can be utilized without using the tripod 510. For example, the laser scanner 505 can be installed on a factory/building ceiling and linked to a digital platform. Multiple laser scanners 505 can be used to measure environment 500. The measurement of the environment 500 results in the generation of an electronic model comprising a collection of 3D coordinate points on surfaces of the environment. This collection of 3D coordinate points is sometimes referred to as a point cloud.

Figure 6:
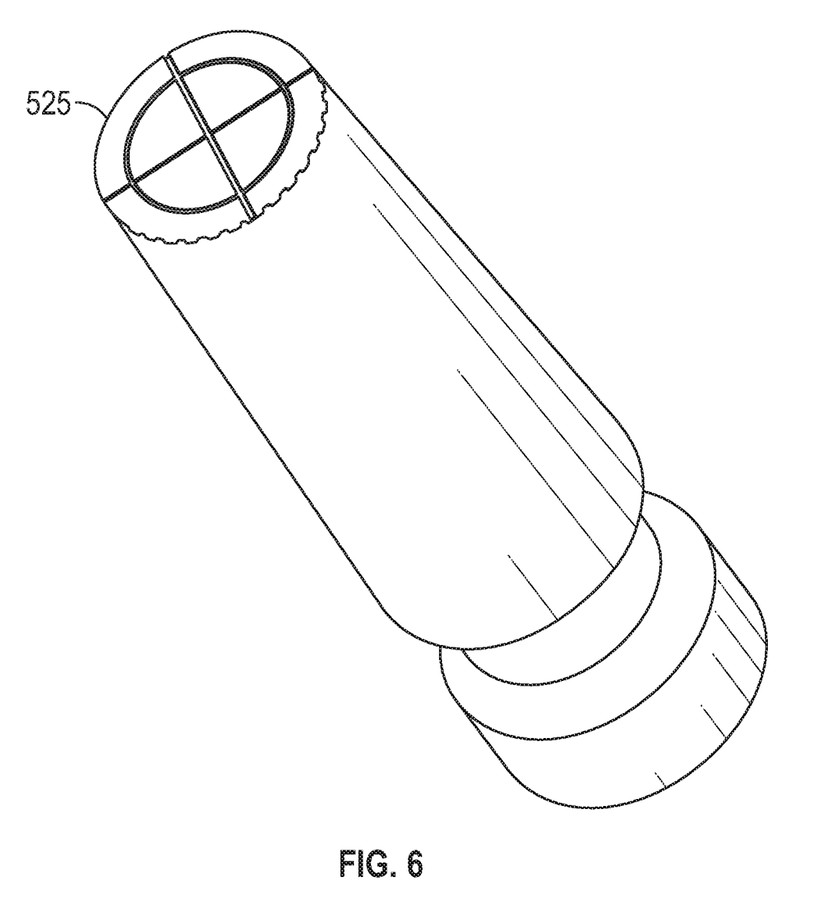
FIG. 6 illustrates an exemplary marker of FIGS. 5A and 5B according to an embodiment.

One or more targets or markers (markers) 525 (additionally illustrated in FIG. 6) can be placed at locations with the environment 505. The one or more markers 525 can be recognized by the laser scanner 505. The one or more markers 525 can each have an associated Quick Response (QR) code with a unique identifier (relative to other markers placed within the environment). The location of the markers 525 may be identified with a desired level of accuracy based on the scan of the environment 500 be the laser scanner 505. It should be appreciated that where a higher level of accuracy is desired, the locations of the markers 525 may be measured using another 3D measurement device, such as a laser tracker or a total station for example.

Using the point cloud generated by the laser scanner 505, a user can create a layout plan in a digital tool to mark certain points with the one or more markers 525. The locations in which the one or more markers 525 are placed can be dependent on which points within the environment 500 the user deems as desired reference points.

Figure 5B:
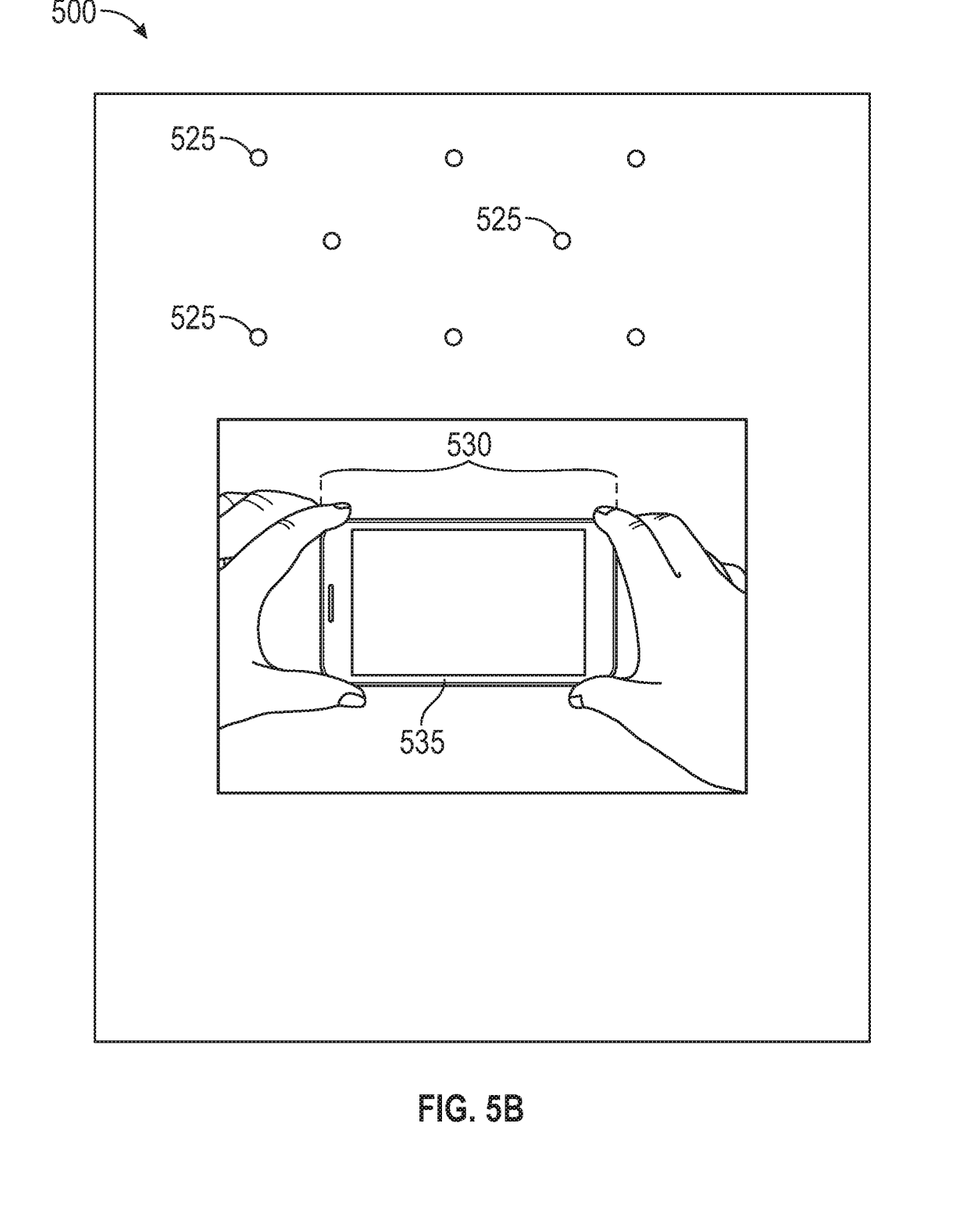
FIG. 5B illustrates a camera used to capture an image of an environment according to an embodiment.

When a photogrammetry camera or a mobile device having a camera 535 (e.g., a mobile phone) captures an image of the environment 500 (see FIG. 5B) within a field of view (FOV) 530, the reference points can be identified. These reference points can be compared with a reference system with known coordinates, i.e., a Golden Model, reference model or ideal model. In an embodiment, the Golden Model is created from the point cloud generated by the laser scanner 505. A position of the photogrammetry camera or the mobile device can be calculated with six-degrees of freedom and stored inside the obtained image. The image can be uploaded to a digital platform, for example, a webshare cloud, and used as additional information when generating a digital twin of environment 500, or a link between the digital twin and environment 500. The digital twin can be a representation (e.g., a 3D model) of the factory/building having focal points (locations where markers had been placed) placed within the 3D model. In the exemplary embodiment, the digital twin is created from the point cloud generated by the laser scanner 505, or may be the point cloud generated by the laser scanner 505. The digital platform can display the 3D model on a computer, or to the user or another individual when located in environment 500, i.e., on site, by projecting the locations of the one or more markers 525 within environment 500. It should be appreciated that at least some portions of the environment 500 may change over time. For example, where the environment 500 is a manufacturing environment, the type and placement of equipment within the environment 500 may be moved or changed. Thus, embodiments provided herein provide advantages in allowing a viewer of the digital twin to view images of the environment 500 as it has existed over time, rather than a static model from when the environment 500 was scanned by the laser scanner 505.

Figure 7A:
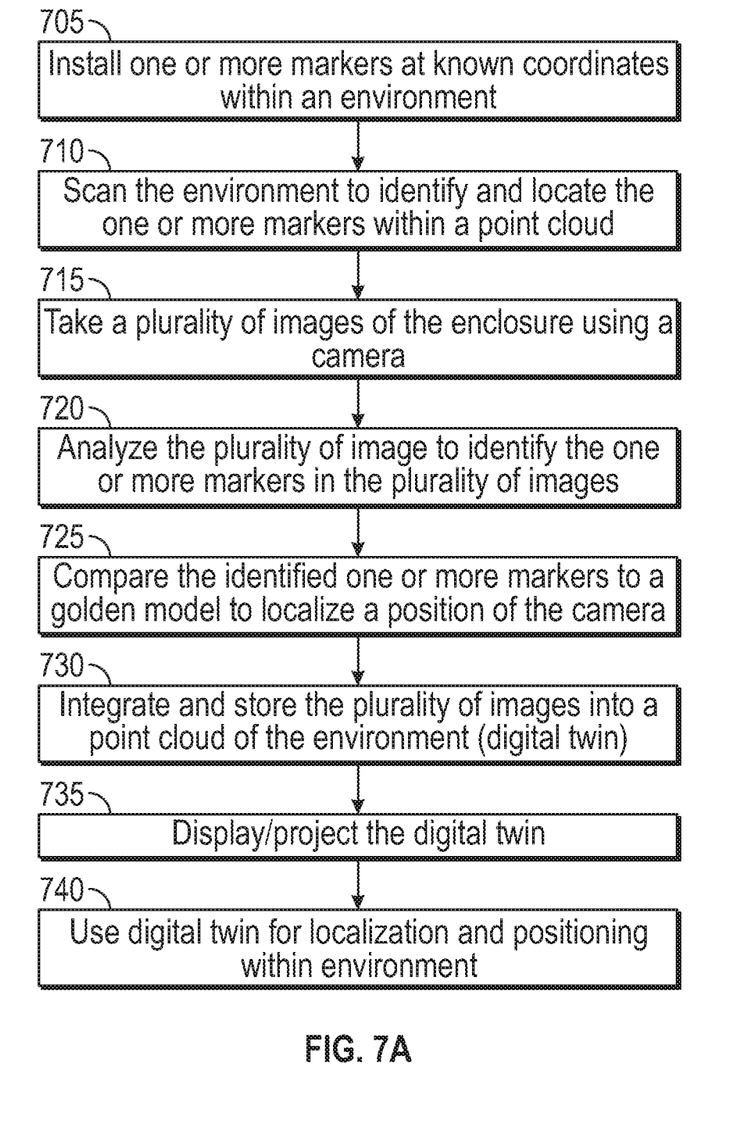
FIG. 7A illustrates a flow diagram illustrating a method for updating a point cloud of an environment having markers according to an embodiment.

FIG. 7A is a flow diagram illustrating a method of providing image localization using a reference system. At block 705, one or more makers can be installed at one or more locations within an environment. At block 710, the environment can be scanned to identify and locate the one or more markers within a point cloud. Alternatively, the locations of the one or more markers can be measured, e.g., with a laser tracker, and inserted into an existing point cloud or Golden Model. At block 715, a photogrammetry camera or a mobile device can be used to obtain one or more images of the environment. At block 720, controller/computer can analyze the one or more images to identify each of the one or more markers in the environment and an associated location for each of the one or more markers within the point cloud or digital twin. At block 725, controller/computer can compare the identified one or more markers to a known reference system in order to localize a position of the photogrammetry camera or the mobile device. At block 730, the controller/computer can integrate the one or more images into a point cloud of the environment, which is then stored. At block 735, the digital twin can be displayed and/or projected to a user. At block 740, the digital twin can be used for localization and positioning within the environment, for example, a representation of equipment layout/placement, etc. It should be appreciated that this allows for the automatic or semi-automatic updating of the images within the digital twin over time as the environment changes.

Figure 7B:
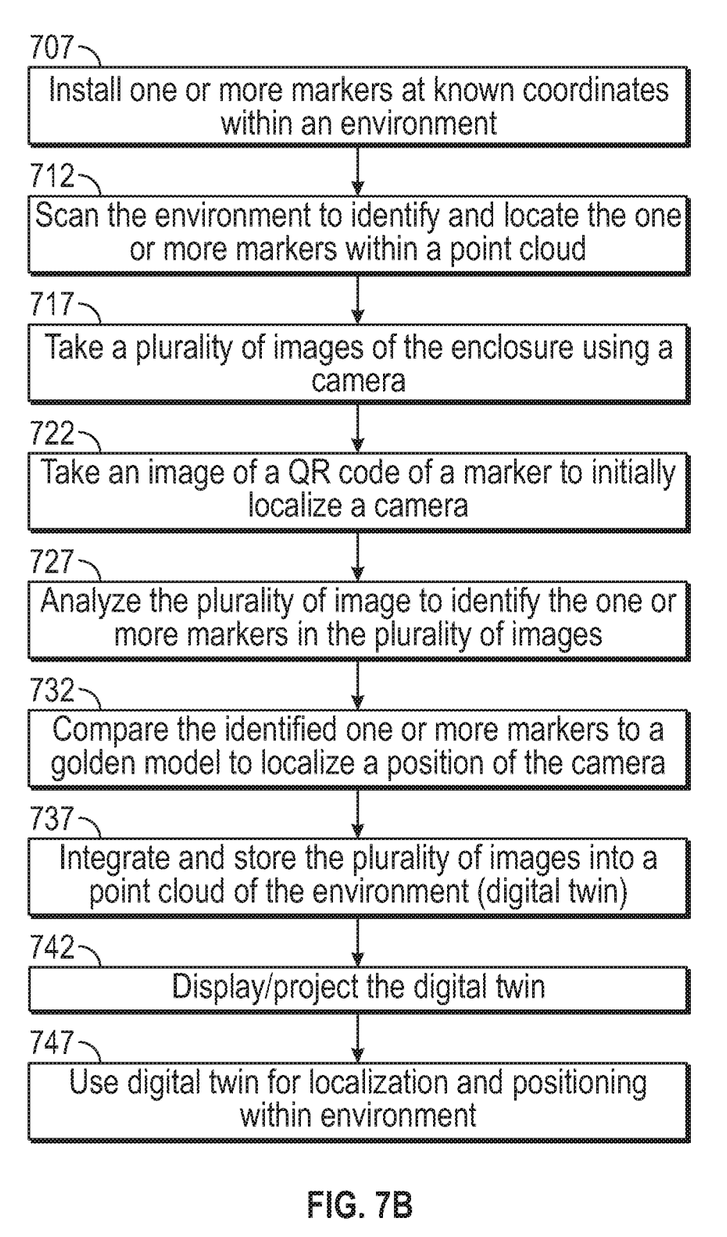
FIG. 7B illustrates a flow diagram illustrating a method for updating a point cloud of an environment having markers according to an embodiment.

FIG. 7B is a flow diagram illustrating a method of providing image localization using a reference system. At block 707, one or more makers can be installed at one or more locations within an environment. At block 712, the environment can be scanned to identify and locate the one or more markers within a point cloud. Alternatively, the locations of the one or more markers can be measured, e.g., with a laser tracker, and inserted into an existing point cloud or Golden Model. At block 717, a photogrammetry camera or a mobile device can be used to obtain one or more images of the environment. At block 722, an image of a QR code of a marker of the one or more markers can be taken and used to assist in localizing the photogrammetry camera or the mobile device within the environment. For example, a user can scan the QR code and subsequently take pictures in the environment in which the target is in the image, or the user can take pictures in the environment and subsequently scan the QR code. At block 727, a controller/computer can analyze the one or more images to identify each of the one or more markers in the environment and an associated location for each of the one or more markers. At block 732, the controller/computer can compare the identified one or more markers to a known reference system in order to localize a position of the photogrammetry camera or the mobile device within the environment. At block 737, the controller/computer can integrate the one or more images into a point cloud of the environment (digital twin), which is then stored. At block 742, the digital twin can be displayed and/or projected to a user. At block 747, the digital twin can be used for localization and positioning within the environment, for example, equipment layout/placement, etc.

Figure 7C:
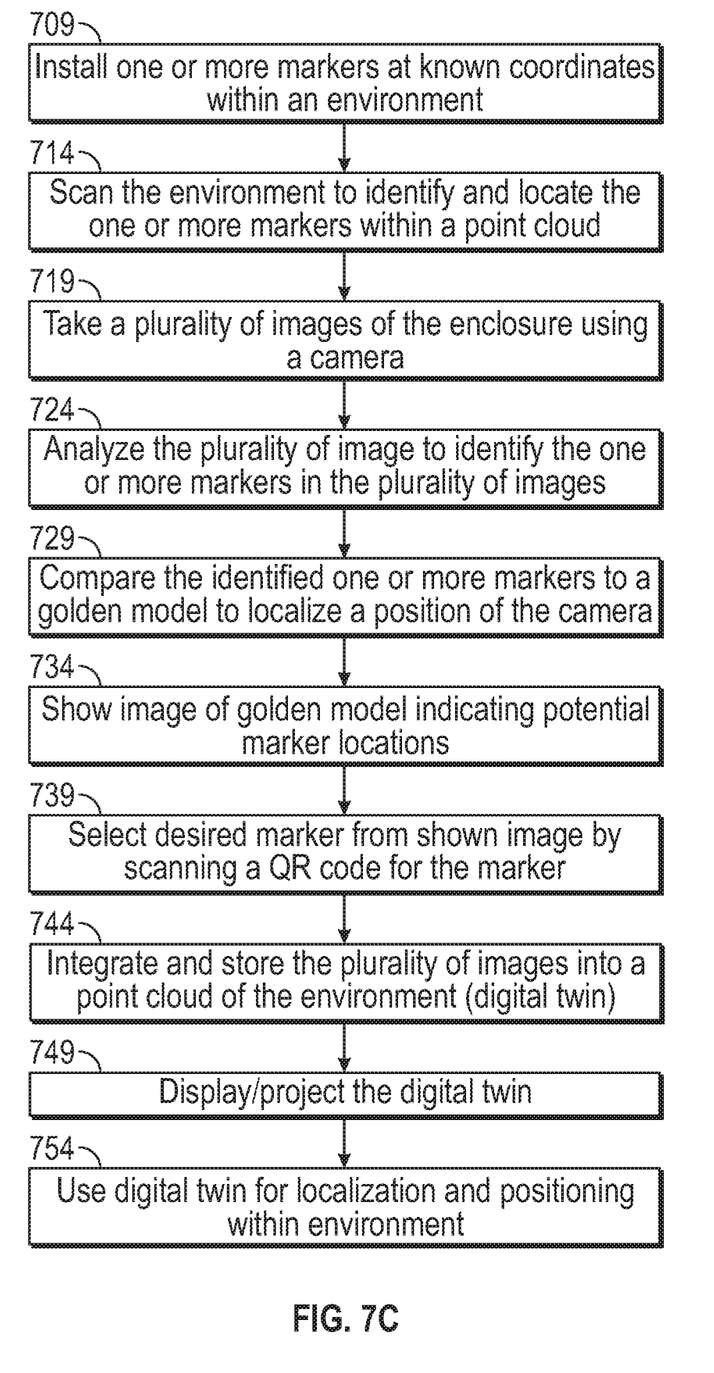
FIG. 7C illustrates a flow diagram illustrating a method for updating a point cloud of an environment having markers according to an embodiment.

FIG. 7C is a flow diagram illustrating a method of providing image localization using a reference system. At block 709, one or more makers can be installed at one or more locations within an environment. At block 714, the environment can be scanned to identify and locate the one or more markers within a point cloud. Alternatively, the locations of the one or more markers can be measured, e.g., with a laser tracker, and inserted into an existing point cloud or Golden Model. At block 719, a photogrammetry camera or a mobile device can be used to obtain one or more images of the environment. At block 724, a controller/computer can analyze the one or more images to identify each of the one or more markers in the environment and an associated location for each of the one or more markers. At block 729, the controller/computer can compare the identified one or more markers to a known reference system in order to localize a position of the photogrammetry camera or the mobile device.

At block 734, the known reference system can be displayed and indicate possible locations for the one or more markers. At block 739, a user can select a displayed marker, for example, by scanning a QR code of the selected marker. At block 744, the scanner can integrate the one or more images into a point cloud of the environment (digital twin), which is then stored. At block 749, the digital twin can be displayed and/or projected to a user. At block 754, the digital twin can be used for localization and positioning within the environment, for example, equipment layout/placement, etc.

Accordingly, the embodiments disclosed herein describe a system that can localize active capturing devices inside an environment with a reference system and enable users to project digital information back to reality. Localization can be established using a 2D image or 360-degree panographic image based on known reference points. Projection of digital data back to reality can occur using, for example, a laser scanner or laser pointer.

The system disclosed herein can take an image. Markers or targets of a reference system are identified as key reference points within the image. The key reference points are then compared with known coordinates of the reference system and the position of the device is calculated and stored inside the image thereby creating a digital twin.

The system disclosed herein can be used in a variety of circumstances. For example, a reference system can be installed inside a factory or building.

Technical effects and benefits of the disclosed embodiments include, but are not limited to providing a system where images of an environment can be automatically or semi-automatically updated in a digital model or point cloud at a location within the digital model that matches the actual location and orientation where the image was acquired.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for updating a point cloud of an environment having markers, the system comprising: a mobile device having camera; and one or more processors responsive to executable computer instructions to perform a method comprising: capturing one or more images of at least a portion of the environment that include one or more markers in the one or more images; identifying the one or more markers within the one or more images; comparing the identified one or more markers to a reference system with known coordinates; and integrating the one or more images into a point cloud, wherein the camera is further operable to take an image of a quick response (QR) code of one marker of the one or more markers; and a 3-dimensional (3D) measuring device is further operable to localize itself using the image of the QR code, wherein the steps of capturing, identifying, comparing, and integrating the one or more images and the image of the QR code are used to update the point cloud.

2. The device of claim 1, wherein the method further comprises locating the markers within the point cloud.

3. The device of claim 1, wherein the method further comprises generating a digital twin of the environment comprising 3-dimensional (3D) coordinate points on surfaces of the environment.

4. The device of claim 3, wherein the method further comprises automatically or semi-automatically updating one or more images of the digital twin over time as the environment changes.

5. The device of claim 1, wherein the one or more markers each include the QR code.

6. The device of claim 1, wherein the 3-dimensional (3D) measuring device is operable to project the reference system of the environment and receive a selection of a marker of the one or more markers.

7. The device of claim 1, wherein the camera is photogrammetry camera or a camera associated with a mobile phone.

8. The device of claim 1, wherein the environment is a factory or building.

9. The device of claim 8, wherein the digital twin is used to layout/place equipment in the factory or building.

10. The device of claim 1, wherein the one or more markers indicates key point within the environment.

11. A method for updating a point cloud of an environment having markers comprising: installing one or more markers within an environment; capturing, by a camera, one or more images of at least a portion of the environment in which the one or more markers are installed; and creating, by a 3-dimensional (3D) measuring device, a digital twin of the environment by: identifying, by the 3D measuring device, the one or more markers within the one or more images; comparing the identified one or more markers to a reference system with known coordinates; and integrating the one or more images into a point cloud, wherein the camera is further operable to take an image of a quick response (QR) code of one marker of the one or more markers and the 3D measuring device is further operable to localize itself using the image of the QR code, wherein the steps of capturing, identifying, comparing, and integrating the one or more images and the image of the QR code are used to update the point cloud.

12. The method of claim 11 further comprising automatically or semi-automatically updating one or more images of the digital twin over time as the environment changes.

13. The method of claim 11, wherein the one or more markers each include the QR code.

14. The method of claim 11 further comprising projecting the reference system of the environment and receiving a selection of a marker of the one or more markers.

15. The method of claim 11, wherein the camera is photogrammetry camera or a camera associated with a mobile phone.

16. The method of claim 11, wherein the environment is a factory or building.

17. The method of claim 16, wherein the digital twin is used to layout/place equipment in the factory or building.

18. The method of claim 11, wherein the one or more markers indicates key point within the environment.

* * * * *

UNITED STATES PATENT AND TRADEMARK OFFICE
CERTIFICATE OF CORRECTION

PATENT NO. : 10,984,240 B2
APPLICATION NO. : 16/377659
DATED : April 20, 2021
INVENTOR(S) : Denis Wohlfeld et al.

Page 1 of 1

It is certified that error appears in the above-identified patent and that said Letters Patent is hereby corrected as shown below:

In the Specification

Column 7, Line 6, delete "126"

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*